(12) United States Patent
Waldstädt

(10) Patent No.: US 6,886,437 B2
(45) Date of Patent: May 3, 2005

(54) DEVICE FOR OPENING PLASTIC BOTTLES BY CUTTING THE DOME

(75) Inventor: Manfred Waldstädt, Mainz (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 104 days.

(21) Appl. No.: 10/239,918
(22) PCT Filed: Mar. 21, 2001
(86) PCT No.: PCT/EP01/03235
§ 371 (c)(1), (2), (4) Date: Sep. 27, 2002
(87) PCT Pub. No.: WO01/74563
PCT Pub. Date: Oct. 11, 2001

(65) Prior Publication Data
US 2003/0188620 A1 Oct. 9, 2003

(30) Foreign Application Priority Data
Mar. 30, 2000 (DE) .......................... 100 15 763

(51) Int. Cl.⁷ ............................................. B23B 3/26
(52) U.S. Cl. .......................................... 82/70.2; 83/946
(58) Field of Search ...................... 83/946, 914, 465; 82/70.2, 71–74; 425/806

(56) References Cited

U.S. PATENT DOCUMENTS

| 3,555,765 | A |   | 1/1971  | Wettlen et al. |
| 3,597,793 | A | * | 8/1971  | Weiler et al. .............. 425/317 |
| 3,682,026 | A | * | 8/1972  | Criss et al. ................ 82/75 |
| 3,783,724 | A | * | 1/1974  | Uhlig ......................... 83/140 |
| 3,818,793 | A | * | 6/1974  | Round ........................ 84/454 |
| 3,992,857 | A |   | 11/1976 | Giacomelli et al. |
| 3,999,678 | A |   | 12/1976 | Ignell et al. |
| 4,305,904 | A |   | 12/1981 | Black |
| 4,445,406 | A |   | 5/1984  | Thatcher |
| 4,954,071 | A |   | 9/1990  | Austin |
| 5,163,347 | A |   | 11/1992 | Le Naour et al. |
| 5,167,968 | A |   | 12/1992 | Dunlap et al. |
| 5,201,788 | A |   | 4/1993  | Le Naour |
| 5,257,560 | A |   | 11/1993 | Palazzolo |
| 5,372,300 | A |   | 12/1994 | Nedstedt |
| 5,498,149 | A |   | 3/1996  | Bengtsson |
| 5,498,225 | A |   | 3/1996  | Nedstedt |
| 5,603,249 | A |   | 2/1997  | Weber et al. |

FOREIGN PATENT DOCUMENTS

| DE | 1229710 | 12/1966 |
| DE | 1933075 | 5/1971 |
| DE | 2128218 | 12/1971 |
| DE | 1604595 | 2/1972 |
| DE | 2124748 | 8/1974 |
| DE | 2155127 C2 | 12/1982 |
| DE | 2361397 C2 | 1/1985 |
| DE | 2517390 C3 | 6/1986 |
| DE | 3500175 C2 | 7/1987 |

* cited by examiner

Primary Examiner—Kenneth E. Peterson
(74) Attorney, Agent, or Firm—Burns, Doane, Swecker & Mathis, L.L.P.

(57) ABSTRACT

A device for opening blown plastic bottles that are hermetically closed by a dome and mounted in a duct by cutting the dome using a cutting knife mounted in a cutting head that can move relative to the dome along the periphery thereof. The opening device includes holding members having at least two centering fingers, which can move radially relative to the dome to engage with the part of the dome that is to be cut off.

16 Claims, 7 Drawing Sheets

DEVICE FOR OPENING PLASTIC BOTTLES BY CUTTING THE DOME

FIELD OF THE INVENTION

The invention concerns a device for opening blown plastic bottles which are air-tightly closed by a dome which is fused shut, and which in particular are provided with a closure screwthread and which are disposed in holding means on a passage, by cutting off the dome with a cutting blade which is mounted in a cutting head and which is movable relative to the dome along the periphery thereof.

BACKGROUND OF THE INVENTION

It is known for an extruded plastic tube to be cut to length in a portion-wise manner and for plastic bottles to be blown therefrom. This then involves what are referred to as EBM bottles (Extrusion Blow Molding). The plastic material of such known bottles is HDPE (High Density Polyethylene). Those plastic bottles are closed by the dome which is formed from the tube portion in the blowing operation (the dome is also referred to as the "blowing tulip") being fused closed and left on the bottle, in the air-tightly fused condition. When that fusing operation is effected using sterile air or in an atmosphere with a low level of germs, the internal space of the respective plastic bottle is germ-free or has a low level of germs therein, and remains in that condition until the dome is removed. The operation of fusing the bottle dome shut can be effected for example by a procedure whereby the walls of the dome are pressed against each other by two pressing jaws which are moved towards each other, and thereby the walls are heat-sealed to each other as long as the plastic material of the dome walls is still sufficiently hot. Such plastic bottles can be pre-produced and stored until they are filled, without the risk of contamination of the interior of the bottle. In the known opening process, the bottle, before being filled in the filling machine, is sterilized on the outside, dried, and then the dome on the bottle is cut off in a clean room environment.

In the known device, the operation of cutting off the bottle dome is effected by a cutting blade which is moved transversely with respect to the direction of movement of the blowing dome, laterally to same, and the bottle is held in the region of the main body portion of the bottle, with the disadvantage that the cut can go astray because the spacing between the holding action at the main body portion of the bottle and the cutting location at the bottle dome is comparatively large and permits twisting in the course of the cutting movement. Waste particles which are produced in the cutting operation are sucked away or blown away by means of a flow of sterile compressed air, whereby valuable sterile air is continuously lost. A cut cannot be precisely guided when dealing with larger bottles.

The attempt has therefore already been made to hold a blade pneumatically movably on a cutting head in such a way that, after the plastic bottle has been clamped fast in its lower region, the blade is guided around the dome region. In this case also the cut cannot be precisely initiated at the desired location because the bottle is not accurately centered and the torque occurring due to the rotating blade at the neck and dome of the bottle is not compensated and properly accommodated. In addition the blade moves under the effect of friction over the laterally projecting spray-over skin on the dome, which skin can be torn off and drop into the interior of the bottle. A further disadvantage is that holding the bottle in its lower region means that it is only ever possible to process one type of bottle, and for cutting off the dome on another type of bottle, the machine has to be converted beforehand. With an expensive construction, the pneumatically actuated cutting blade is pushed a distance into the central passage of the cutting head and the waste particles and pieces which are cut off are sucked away through the central passage, with the disadvantage of continuous losses of sterile air. The cutting head and the blade drive require expensive rotatable structures and pneumatically sealed passages.

SUMMARY OF THE INVENTION

Therefore the object of the present invention is to improve the device for opening plastic bottles having the features of the kind set forth in the opening part of this specification, in such a way that a precisely executed cut under aseptic conditions becomes possible.

In accordance with the invention, for bottle-like packagings of different plastic materials, that object is attained in that the holding means for engagement with the portion of the dome, which is to be cut off, have at least two centering fingers which are movable radially relative to the passage and which are arranged closer to the bottle end of the cutting head than the cutting blade. Surprisingly, a multiplicity of plastic bottles of different configurations can be provided very precisely with a cut at the location of the bottle neck where the dome or the portion of the dome, which is to be cut off (if a portion of the neck is deemed to be part of the dome) is to be separated from the overall body of the bottle. As in the known case the respective plastic bottle is admittedly also held in holding means, but in accordance with the invention the holding means are disposed at the portion of the dome, which is to be cut off; they are therefore in engagement with the dome when the dome is to be cut away from the neck of the plastic bottle, along the cut line, as a whole. The spacing between the position at which the dome is held and the cutting location is a multiple shorter than the spacing between the bottom of the bottle and the neck of the bottle. Therefore, as a result of the short lever arm relative to the engagement location between the dome and holding means, cutting forces applied in the region of the cut line advantageously exert only a very low level of torque, so that the dome is guaranteed to be held as far as the cut line, with a high degree of accuracy.

The holding means have at least two centering fingers which, like fingers, come into engagement with the groove between the neck of the bottle and the dome on preferably diametrally opposite sides. When the holding means have three or more centering fingers, they are desirably arranged distributed substantially uniformly over the periphery along the round cut line.

The centering fingers are movable radially with respect to the passage which is disposed centrally in the device. The centering fingers can therefore come into engagement with the outer surface in the bottom of the described groove between the neck and the dome, or can come out of engagement therewith by being moved radially outwardly. It is thus possible to provide a holding action which can also be released again.

The centering fingers serve on the one hand for centering the respective bottle. They also serve however for positioning the cut edge relative to the cutting blade. The spacing between the bottom of the groove on the neck of the bottle at the top thereof, where the cut line is to be made, on the one hand, and the cutting blade on the other hand, is established in the radial movement of the centering fingers.

In a preferred embodiment which is described in greater detail hereinafter, that spacing can also be altered by moving the blade. In particular however the cut line is adjusted on the bottle in the axial direction relative to the blade by the centering fingers.

The further action of the centering fingers that they carry the torque which is applied to the neck of the bottle and the dome by the cutting operation is particularly advantageous.

By virtue of the fact that the centering fingers are arranged closer to the bottle end of the cutting head than the cutting blade, the dome of the bottle itself is held precisely in the above-described manner, with the possibility of carrying the torque involved and the option of axial adjustment of the cut edge line relative to the blade.

In the case of filling machines, the operation of cutting off the dome under clean room conditions is preferably effected fairly immediately before the filling station. As, in the filling operation, it is desirable for the filling material, preferably liquid filling material, in particular liquid foodstuffs such as milk or juices, to be guided vertically downwardly, the bottles to be filled are arranged vertically with their opening facing upwardly. The dome is then disposed above the cut line, at the level of which the cutting blade is also arranged. The term "closer to the bottle end of the cutting head" therefore means that, in the preferred embodiment just described above, with an approximately vertical longitudinal axis for the bottle and also for the cutting head, the centering fingers are arranged "above" the cutting blade.

The fact that the bottle is held at the dome (instead of being held at the bottom of the bottle) signifies that the plastic bottle is handled, irrespective of the geometrical configuration thereof. It is therefore possible to envisage bottles of differing cross-sections, short thick packs or also long thin bottles, which can all be precisely held with the holding means according to the invention with the centering fingers, without the need for time-consuming conversion operations between one type of bottle of a first configuration to a second type of bottle of a different configuration.

In spite of those simplified options of use, accurate adjustability of the cut line is possible, especially since, as is known, the region of the dome and the neck of a plastic bottle involves a strong structure.

In an advantageous desirable configuration of the invention the holding means additionally have at least one arresting pin arranged in the region of the centering fingers. The dome is pushed into the passage through a receiving opening provided at the bottle end on the passage, and the arresting pin can then engage into the corresponding annular groove and hold the dome with the neck and bottle non-losably downwardly. After the operation of cutting off the dome the at least one arresting pin provides that the cut-off dome remains suspended in the passage, initially at the bottle end which, when the passage is arranged vertically, is the lower end. The arresting pin can be desirably arranged to be spring-loaded and can have an inclined surface such that the respective dome which has not yet been cut off, upon the introduction thereof into the passage, urges the arresting pin aside, whereafter it snaps out and engages into the respective groove on the dome. It will be appreciated that two or more arresting pins improve the mode of operation here. The arresting pins can be arranged at the same height and between the centering fingers. As a result the amount of space required by the new cutting head is slight. When the next dome which has not yet been cut off the bottle is then pushed along the passage, it pushes the dome which is held by the arresting pin at the bottle end of the passage upwardly away from the bottle end of the passage. In that way, a respective lower dome can push the dome which has been cut off and which is positioned thereabove further upwardly into the passage. Entire stacks of cut-off domes can be collected and pushed slowly out of the passage at the top and thereafter transported away without the need for each dome to be individually sucked away, which would involve the loss of valuable sterile compressed air.

In accordance with the invention it is also desirable if the cutting blade is movable radially relative to the passage by way of a pivotably driven blade shaft extending parallel to the longitudinal axis of the passage. In that way the cutting blade can be moved radially out of engagement from the groove between the neck of the bottle and the dome, that is to say from the location of the cut line, so that the workpiece portions can be introduced into the passage, displaced therein and/or also removed therefrom; and on the other hand the beginning and the end of the cutting operation can be precisely determined by the reversed radial inward movement of the cutting blade. Admittedly, it is possible to provide a circular cutting blade which can be lowered into the groove with the cut line and caused to cut it, but a preferred embodiment is one in which the cutting blade has at least in part straight edges and they perform the cutting operation, preferably at a pointed end.

It is also desirable in accordance with the invention if the blade shaft is mounted in an annular rotor which extends around a stator containing the passage, and if the rotor is driven rotatably with respect to the stator. The plastic bottle with the neck and the dome can then be precisely held in the stator while the rotor with the blade shaft and the cutting blade mounted thereto is passed at the periphery around the non-rotatably held dome. In that way the cutting operation of a circular or straight cutting blade is effected along the line provided for the cut.

In accordance with the invention moreover the cutting blade can be formed by at least two straight edges of which one is a cutting edge and intersects the other at an angle which is preferably approximately 90° and particularly preferably less than 90°. In contrast to the circular cutting blade the preferred embodiment in plan is triangular or trapezoidal. When looking onto the flat cutting blade, it is then possible to see at least two straight edges which intersect at an angle of for example 40–60°. A highly advantageous configuration of the cutting blade provides that one of the two intersecting edges is a cutting edge while the other can remain blunt. Such a flat cutting blade with at least two straight edges can be quickly and easily replaceably secured by way of a blade holder to the blade shaft, by means of which the cutting blade can be moved into and out of engagement with the workpiece.

It is also advantageous if, in a further configuration of the invention, the cutting edge is formed by two cutting planes which intersect at a second acute angle and it extends parallel and at a spacing from the upper and lower plane of the cutting blade. It will be appreciated that this preferred flat cutting blade is of a finite thickness, for which reason there is an upper plane and parallel thereto a lower plane. In order to have a cutting edge, two planes are formed at least at that one edge, for example by forging, stamping or grinding. The resulting planes are referred to herein as the cutting planes. One extends from the upper surface of the cutting blade and the other from the lower plane of the cutting blade. The two intersect at the second acute angle which is of a value of between 3° and 30°, preferably between 5° and 10°. The two cutting planes intersect forming the desired cutting edge approximately at the center between the upper and lower planes of the blade. It has been found that a particularly clean cut is produced with a cutting blade produced in that fashion. The cut advantageously does not wander off, when passing around the dome of a bottle. When using the proposals according to the invention with the angular dimensions involved, the plastic material is not greatly displaced by the cutting blade. In that respect, it is preferable if the depth of penetration of the blade tip is approximately equal to the thickness of the material. The tip of the cutting blade (at the end of the cutting edge), at the beginning of the cutting operation at the position 0°, is dug into the material to such a distance that it is just the entire thickness of the material that is pierced in that way. Rotation of the rotor then begins and the blade is passed around along the groove so that the cut is finished after passing through 360°.

Such a cutting blade according to the invention permits the cut to be made precisely at the desired line without the development of cutting dust, the production of waste particles or other waste pieces. Therefore no waste particles drop into the bottle which is kept sterile in its interior. That means that it is particularly desirably possible to use the device according to the invention under aseptic conditions. As soon as the cut is completed the bottle is guided away from the cut-off dome by a movement of the cutting head relative to the bottle, and the bottle then passes into the filling station.

A further preferred embodiment of the invention is characterized in that control of the radial pivotal movement of the cutting blade is effected by way of a control roller which is rotatably connected to the blade shaft and which upon rotation of the rotor passes around a control cam non-rotatably fixed to the stator. While a blade holder is mounted to the blade shaft (at the bottom) at the bottle end of the stator and is moved in the above-described manner (radially by actuation of the blade shaft; and along the periphery by rotation of the rotor), actuation and pivotal movement of the blade shaft is effected by the control roller which is pivotally mounted to the opposite end (at the top) of the blade shaft passing over the control cam. In that arrangement the control cam is non-rotatably mounted to the stator and the control roller which is preferably connected to the blade shaft by way of a control arm is movable by its mounting in the rotor relative to the control cam. It should be noted in that respect that, in the preferred embodiment, in the radial pivotal movement of the control roller away from the longitudinal axis of the passage, the tip of the cutting blade is moved in the opposite direction towards the dome of the bottle or the groove thereof. The control cam can be suitably designed and it is thus possible, in dependence on the angle involved, to provide for an exact movement of the cutting blade relative to the dome of the bottle, which is held fast precisely on the stator.

In a further advantageous configuration of the invention the control cam which extends in an annular configuration around the passage at a spacing has an opening in the radial direction, and a circular control ring is provided non-rotatably and axially movably with respect to the control cam, wherein the outside diameter of the control ring is approximately equal to the largest outside diameter of the control cam. To describe the position of the opening in the control cam, it is possible to envisage a circular disc whose periphery is indented to a greater or lesser degree at one location. That indentation corresponds to the opening. The periphery of the circular disc is therefore interrupted by the opening. In the preferred embodiment the disc is an annular control cam which is round—except for the opening. Extending through that central control ring is the passage in which the cutoff domes are pushed upwardly and disposed of.

The purpose of that opening is to hold the cutting blade in a radially outwardly moved position, for insertion and/or removal of the bottle dome, while the neck of the bottle and/or the dome are moved axially relative to the bottle past the blade upwardly and downwardly. That advantage of the opening, without the above-mentioned control ring, would entail the disadvantage that the cutting blade could not perform a cut extending completely through 360°. The axially movable control ring bridges over the opening in a given operating condition so that at any event the cutting blade can perform the cut which extends over at least 3600.

In the region of the opening the outside diameter of the control cam has been considerably reduced. Outside the opening however the periphery of the control cam is round. In that region the outside diameter of the control ring is equal to the outside diameter of the control cam. By moving the control ring towards the control cam therefore it is possible advantageously to simulate a round control cam, for the control roller; and nonetheless after the axial movement of the control ring away from the control cam, the desired opening is then available in order to be able to hold the cutting blade out of operative engagement in the loading and unloading procedure.

It will be seen that the device according to the invention provides a self-contained cutting head which is operational on its own. It can be used independently of the rest of the design configuration of the machine or the design configuration of the processing station and can be used for dealing with (cutting off the dome of) the plastic bottle. A powerful machine for aseptic production and filling of a plastic bottle generally requires a machine structure which surrounds the bottle and which, upon conversion from one type of bottle to the others, would require considerable modifications to those parts of the machine which come into engagement with the plastic bottle, if the holding action and the cutting activity were implemented by components other than the parts of the device of a simple structure, in accordance with the invention. Therefore the cutting head can be used with a highly universal mode of applicability for bottles with a large number of different shapes as a unit which is operational per se and on its own, especially as the bottle neck and the dome are standardized for a large number of bottles of different configurations.

It will be seen that the cutting head according to the invention can therefore also be put to good use under aseptic conditions because it is easy to clean and also easy to sterilize. A clean cut is achieved at the neck of the bottle by virtue of the bottle being held securely at the dome of the bottle. Simple adjustment for the cut line is also advantageously possible.

In accordance with the invention the device uses few moving parts with scarcely any nooks and crannies, and for that reason sterilization is simple and aseptic operation is possible. Tests with in part colored intermediate layers in the bottle material have shown that waste or other cut particles do not drop into the opened bottle, after the cut is finished.

BRIEF DESCRIPTION OF THE DRAWINGS

Further advantages, features and possible uses of the present invention will be apparent from the description hereinafter of preferred embodiments with reference to the accompanying drawings in which.

DETAILED DESCRIPTION OF THE INVENTION

Figure 1:
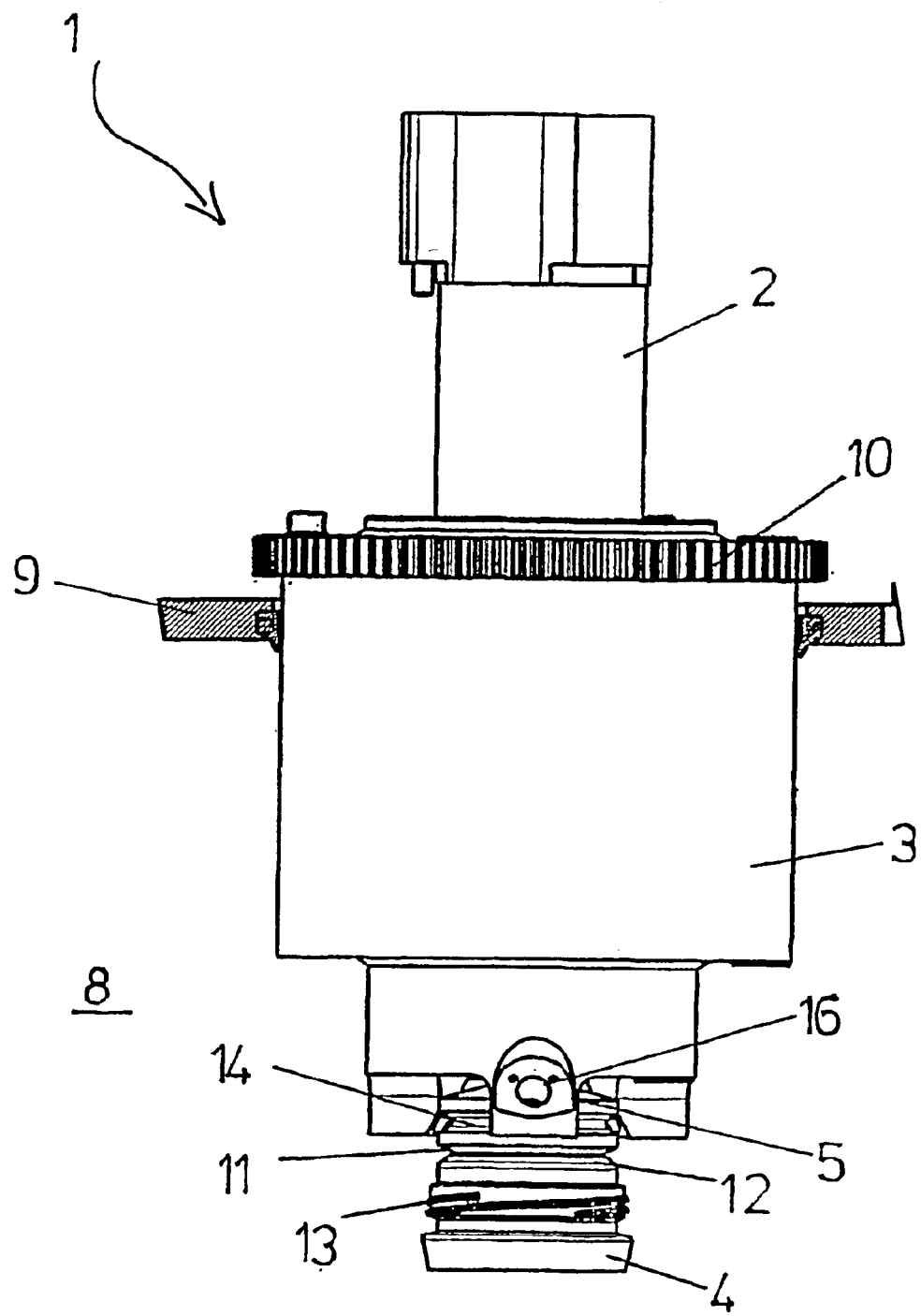
FIG. 1 shows a side view of the cutting head with a bottle neck fitted at the bottom and prior to the cut on the bottle dome which is still mounted thereto, wherein the stator is fixed to a holding plate (not shown) and a sealing plate is shown in broken-away form for affording the separation between the clean room and the normal environment.

FIG. 1 admittedly clearly shows the cutting head in its overall structure, as is generally indicated by reference numeral 1, but the cutting blade, its control devices and pneumatic drives have been omitted for the sake of clarity of the drawing. The cutting head 1 substantially comprises a centrally arranged stator 2 and a rotor 3 which surrounds it and on which a neck 4 and a dome 5 of a plastic bottle (not shown) are held at the bottom. In the embodiment illustrated here the plastic bottle (not shown) is vertical so that its longitudinal central axis coincides with the longitudinal axis 6 of the passage 7, with the longitudinal axis 6 also being disposed vertically. The clean room 8 of the entire machine is disposed beneath the stationary sealing plate 9 which is shown broken-away and in section and above which normal atmosphere prevails. The toothed ring 10 which is fixedly carried on the rotor 3 and provides for the rotary drive thereof is therefore disposed above the sealing plate 9, that is to say not in the clean room in which the sterile plastic bottles are moved by way of conveyors (not shown). Disposed between the neck 4 which is disposed further downwardly and the dome 5, arranged thereabove, of the plastic bottle, in the overall construction with a fixed structure, is a groove 11, at the bottom of which is the location for the actual cut line 12. The closure screwthread of the neck 4 is denoted by reference numeral 13. A ring seal 9' is disposed between the sealing plate 9 and the rotor 3.

Figure 3:
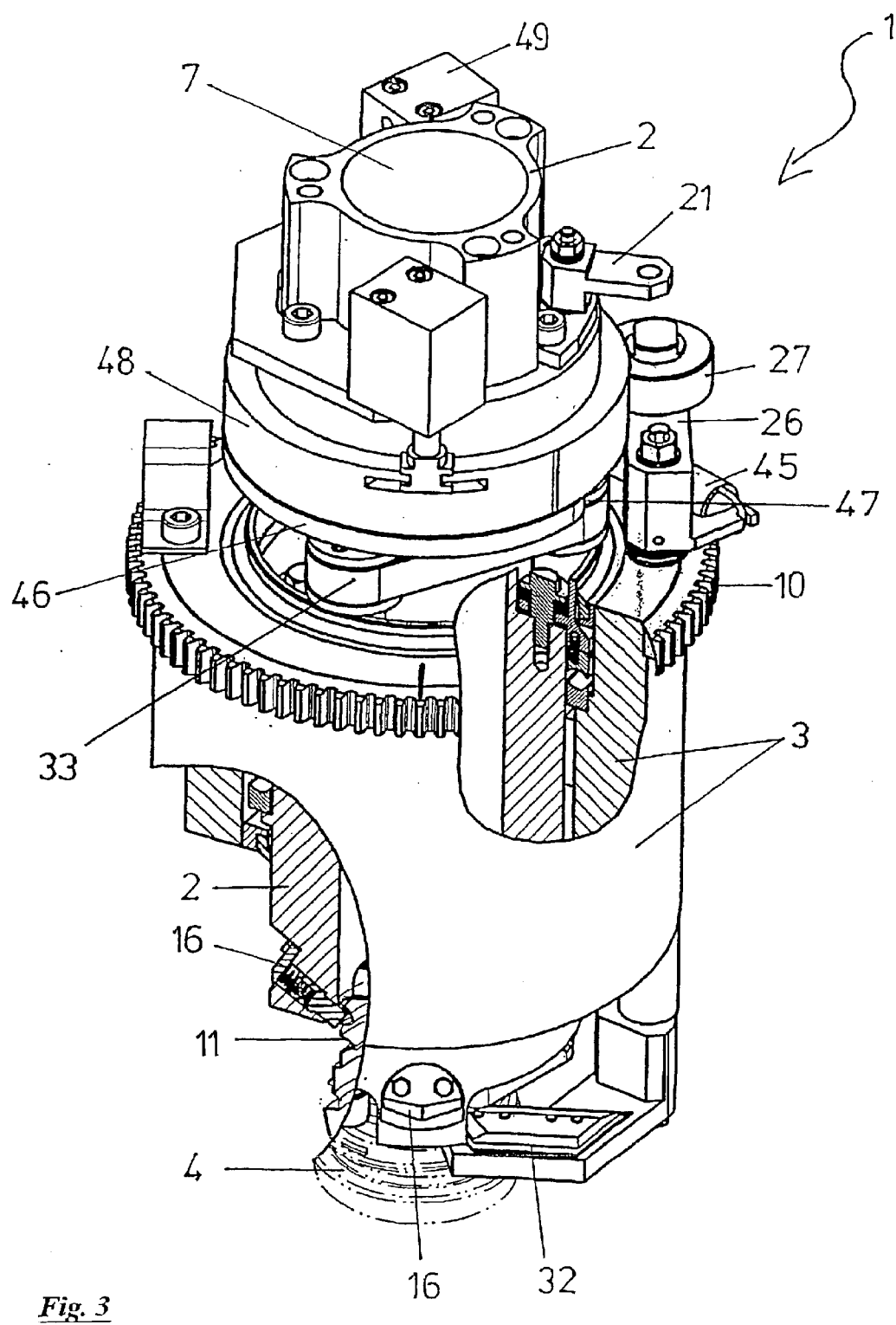
FIG. 3 shows a perspective and partly cut-away view of the cutting head.
Figure 5:
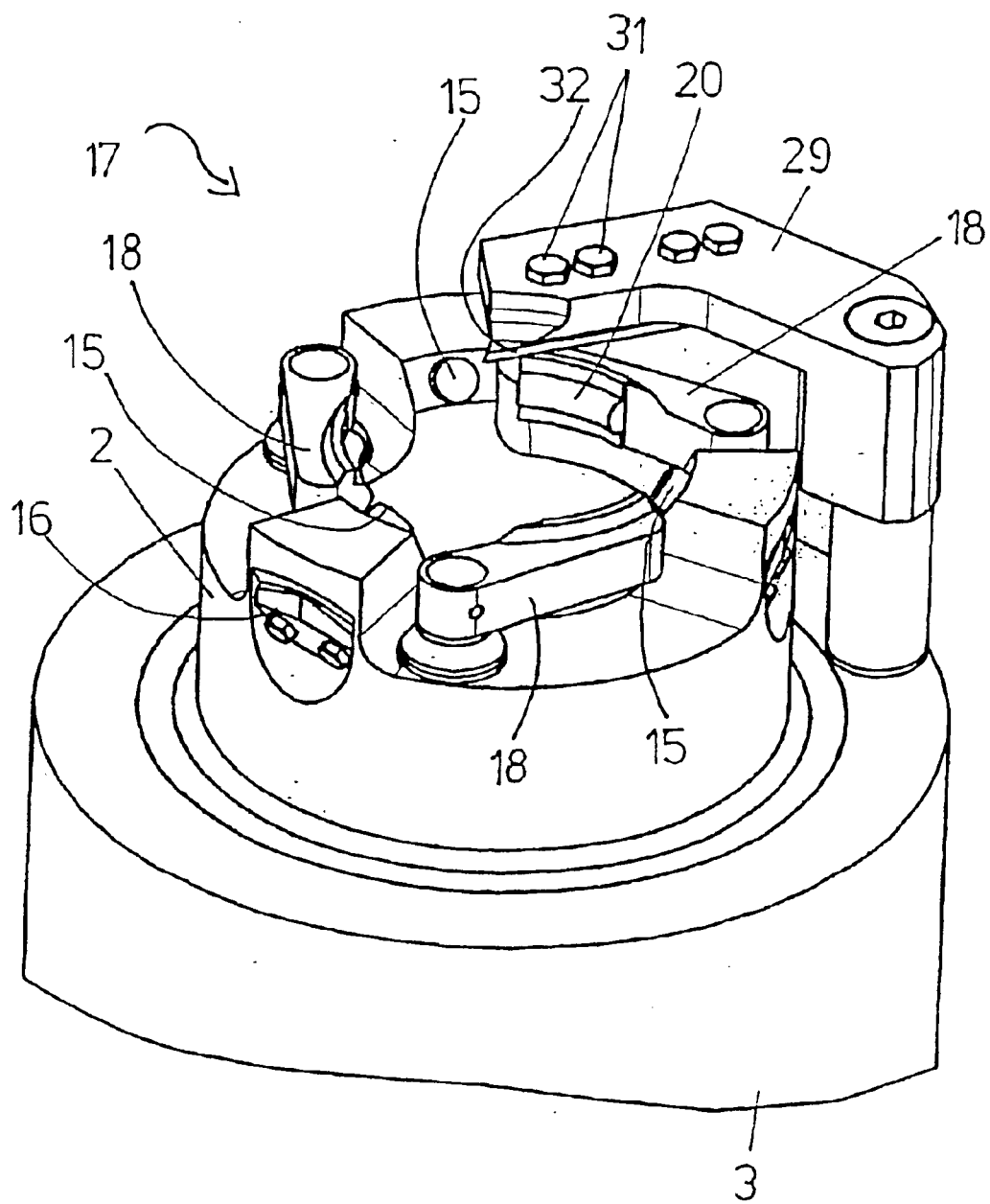
FIG. 5 shows a perspective view onto the underside of the cutting head, approximately when looking from below upwardly in FIGS. 2 and 3.

The surface of the bottle dome 5 has a strong predetermined structure with a holding groove 14 into which engage holding means which are to be described hereinafter. For example the holding means have three arresting pins 15, the fixing 16 of which for example to a plate (see FIG. 3) is shown in FIGS. 1 and 3. FIG. 3 also shows the resiliently loaded arresting pin 15, as it engages into the holding groove of the dome 5. When viewing from below into the passage 7 from the bottle end of the stator which is shown in FIG. 5 and which is generally denoted by reference numeral 17, all three arresting pins 15 can be clearly seen. Their function is such that the dome 5 can be pushed upwardly into the passage 7 in the direction of the longitudinal axis 6 of the passage 7, so that the arresting pins 15 come into snapping engagement in the holding groove 14 and ensure that the dome 5 cannot be pulled downwardly again out of that position.

Figure 2:
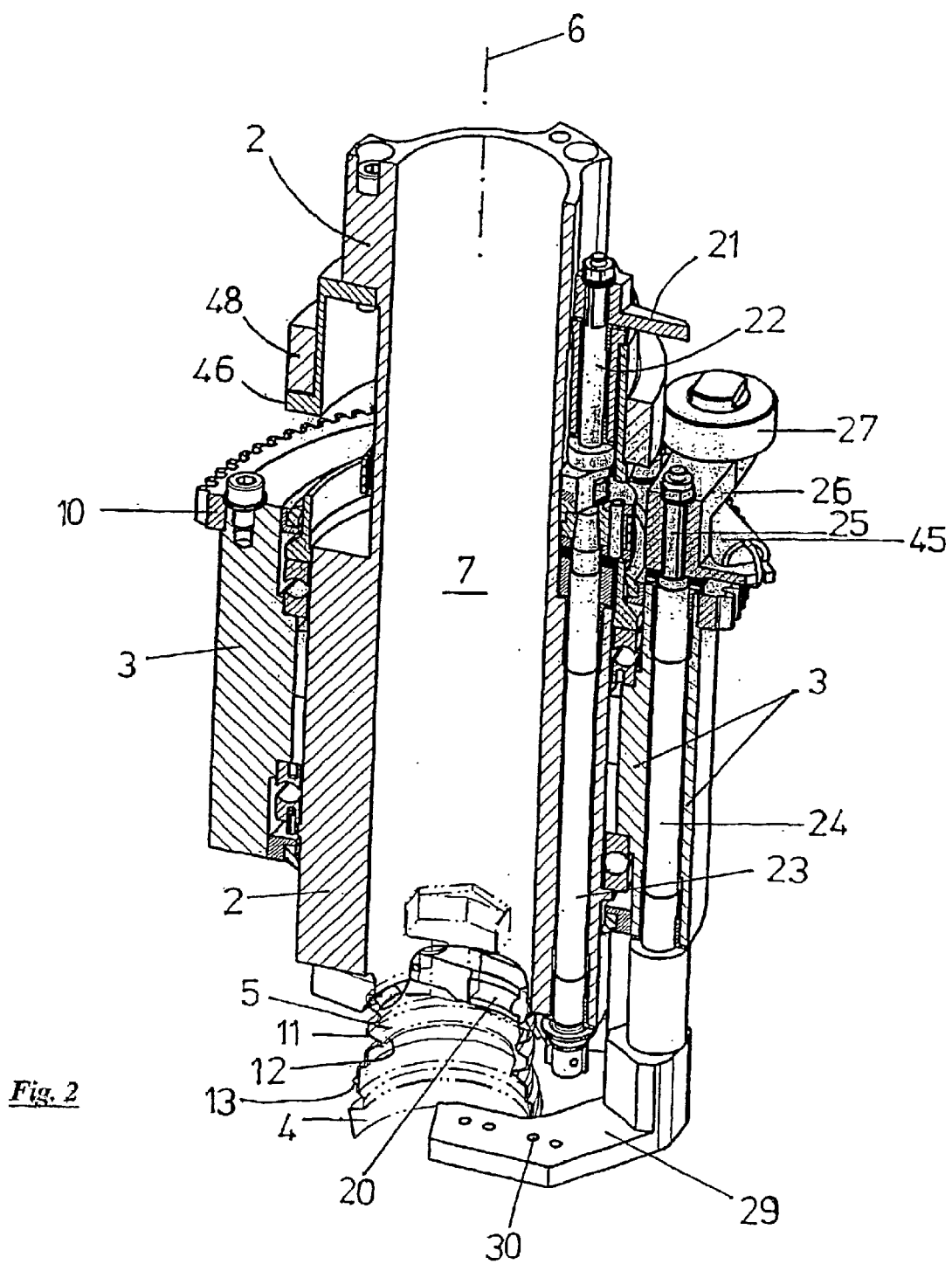
FIG. 2 shows a perspective and centrally sectioned view of the cutting head similar to FIG. 1, additionally showing necessary parts of the device which were omitted in FIG. 1.

Besides the arresting pins 15 however the holding means also have three centering fingers 18. The centering fingers 18 each involve a respective arm which is mounted pivotably at the lower bottle end of the centering finger shaft 19 and on the inside of which is fixed a bead-shaped projection 20. It is at the same height as the arresting pins 15 and is therefore in a position to engage into the holding groove 14 of the dome 5 and, in the event of moderate clamping, it can provide for precisely holding the entire plastic bottle, by way of the dome S. The centering fingers 18 which have a stronger clamping action carry a torque which is applied to the bottle, so that the holding action for the dome and thus the neck 4 and therewith the entire plastic bottle is afforded in a precise, well-defined and reliable fashion. In FIG. 2 a further ring seal 23 is also arranged between the rotor 3 and the stator 2.

The centering fingers 18 are opened, that is to say they are each pivoted outwardly radially with respect to the dome 5, by the drive lever 21 pivoting the centering finger shaft 19 in the clockwise direction as viewed from above, by way of the drive shaft 22. Clamping of the centering finger mechanism, when the bead-shaped projections 20 move radially into the holding groove 14 in the dome 5, then takes place in a correspondingly reversed fashion.

Figure 4:
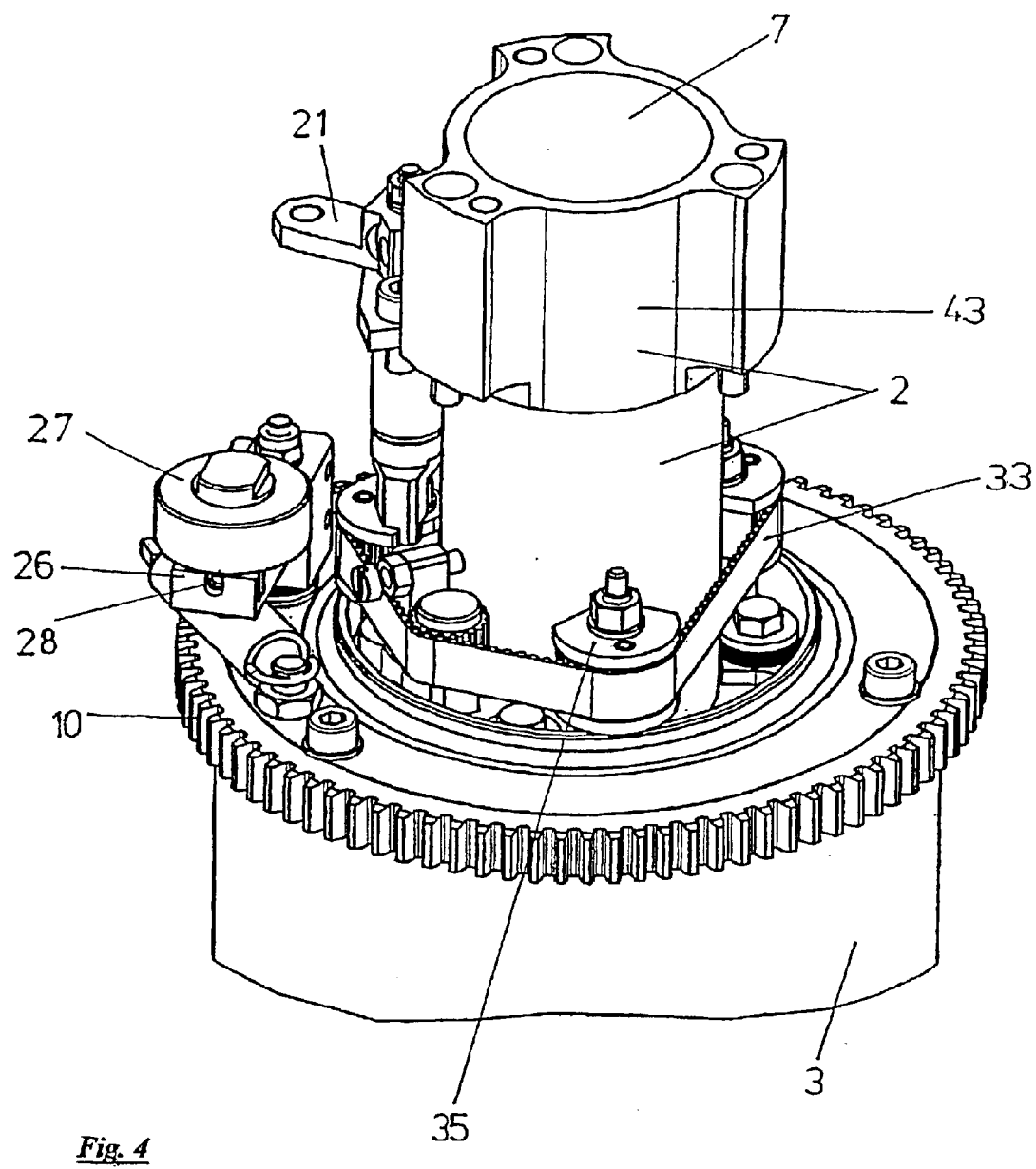
FIG. 4 shows a perspective external view of the upper part of the cutting head, in which here the control cam and the control ring are omitted in order to clearly show other parts of the device.

While the centering finger shaft 19 is mounted in the fixed stator 2, a blade shaft 24 is mounted without play in the rotatable rotor 3. The blade shaft 24 is connected by way of the quadrangular end 25 of the blade shaft 24 to the control arm 26, a controller roller 27 being rotatably mounted to the end of the control arm 26, which is in opposite relationship to the quadrangular end 25. The view illustrated in FIG. 4 shows an adjusting screw 28 in the control arm 26, by means of which it is possible to adjust the cutting depth and the radial engagement of the blade (radially with respect to the longitudinal axis 6 of the passage 7). Mounted at the lower end of the blade shaft 24 is a blade holder 29 which is of an angular configuration and on which a cutting blade 32 can be fixed by way of screws 31 (see FIG. 5) which are fitted into the holes 30 in the blade holder. The cutting height as measured in the direction of the longitudinal axis 6 is fixed.

FIGS. 3 and 4 show a toothed belt 33 which extends around the stator and which drives the centering finger shaft 19 by way of a tensioning roller 34 and at the end 35 of the centering finger shaft by way of the pinion which is in engagement with the teeth. It will be appreciated that toothed belt 33 drives all three centering finger shafts 19. This involves pivotal movements of the order of magnitude of 20°.

Figure 7:
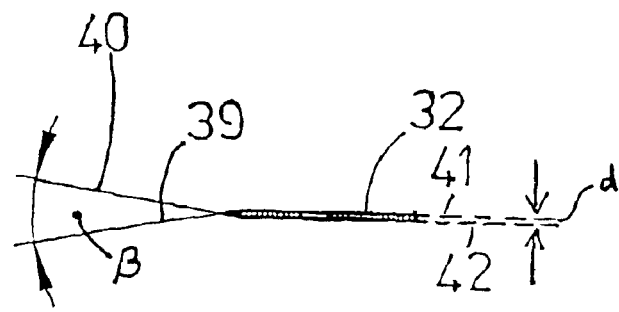
FIG. 7 shows a broken-away sectional view of the cutting blade taken along line VII—VII in FIG. 6.
Figure 6:
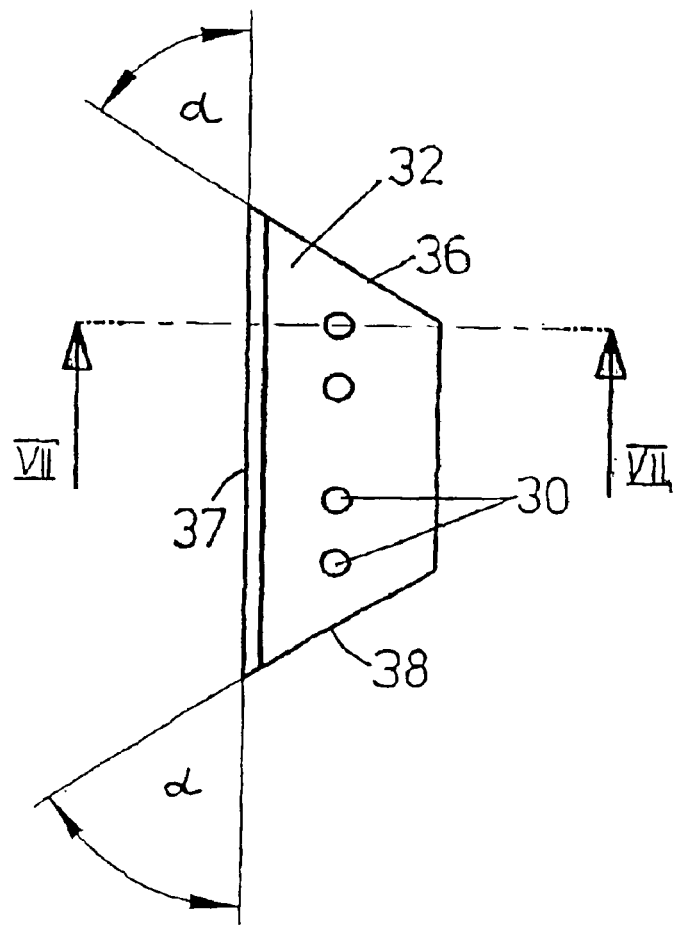
FIG. 6 shows a plan view of a preferred embodiment of the cutting blade.

The cutting blade 32 is shown separately in FIGS. 6 and 7. Also shown here are the holes 30 for passing the screws 31 therethrough. The cutting blade 32 is formed by three straight edges 36, 37 and 38. The central edge 37 is the cutting edge. It is intersected at an angle $\alpha$ of 55° by the adjacent edges 36 and 38 which are blunt. When looking along section line VII—VII in FIG. 6, it is then possible to see the cross-sectional view of the cutting blade 32 in FIG. 7. The second acute angle $\beta$ shown there is 80 and is produced by virtue of the fact that the inclined cutting plane 39 which is the upper plane in FIG. 7 intersects the inclined lower cutting plane 40 at the above-mentioned second acute angle $\beta$. The thickness of the blade d is defined as shown in FIG. 7 by the spacing of the upper plane 41 from the lower plane 42 of the cutting blade 32. The actual cutting edge 37 lies in a plane between those two planes 41 and 42.

The stator 2 is mounted to a holding plate (not shown) by way of the fixing block 43 which is shown at the top in FIGS. 3 and 4 and the bores 44 which are provided in the block 43.

The blade shaft 24 with the control roller 27 mounted to the top thereof and the blade holder 29 mounted to the bottom thereof has already been described. The control arm 26 with the control roller 27 is urged by means of the tension spring 45 to bear against a control cam 46 non-rotatably mounted to the stator 2. It is circular over the major part of its periphery, but in the radial direction it has an opening 47 which will be described hereinafter with reference to FIG. 8.

So that the cutting blade 32 is not in the way for loading and unloading the plastic bottle with the neck 4 and the dome 5 in a direction parallel to the longitudinal axis 6 of the passage 7, the device has the opening or recess 47 which allows the control roller 27 to be moved radially somewhat closer to the central longitudinal axis 6 and held there, in other words, the cutting blade 32 can come out of engagement and also be held there. When viewing FIG. 8, it can be envisaged that the control roller 27 is continuously in contact (pulled by the spring 45) with the control cam 46 (outside periphery). From the position I at the end of the opening 47 the control cam 46 extends in the counter-clockwise direction on a circular path of an outside diameter as indicated at Dk (diameter curve) to the position 11 at which the opening 47 begins, upon further rotary movement. The blade holder 29 is now so adjusted relative to the control roller 27 that the cutting blade 32 is in engagement with the plastic material to be cut, over the entire partly circular path between positions I and II (in the counterclockwise direction).

As a cut must correspond to at least 360°, the shorter distance on the control cam 46 between positions 1 and 11 is to be bridged over in such a way that there too the control roller 27 rolls on an outer surface which corresponds to the diameter Dk. Provided for that purpose is a control ring 48 which can be clearly seen in FIGS. 2 and 3. It can be drawn upwardly in a vertical direction parallel to the longitudinal axis 6 out of the lower position shown in FIGS. 2 and 3, by means of the pneumatic drives 49, to such a distance that the control roller 27 would follow the opening 47 if it were further moved from the position II in the counter-clockwise direction to the position I. That opening 47 is so-to-speak switched off for the control roller 27 when the control ring 48 is lowered into the position shown in FIGS. 2 and 3. More specifically, in that case, the control roller 27 rolls against the surface of the control ring 48, which surface is in the form of a circular ring, the diameter of the control ring 48 on the major part of the control cam 46 (at the top in FIG. 1) being equal to the outside diameter Dk (diameter curve) of the control cam 46.

Figure 8:
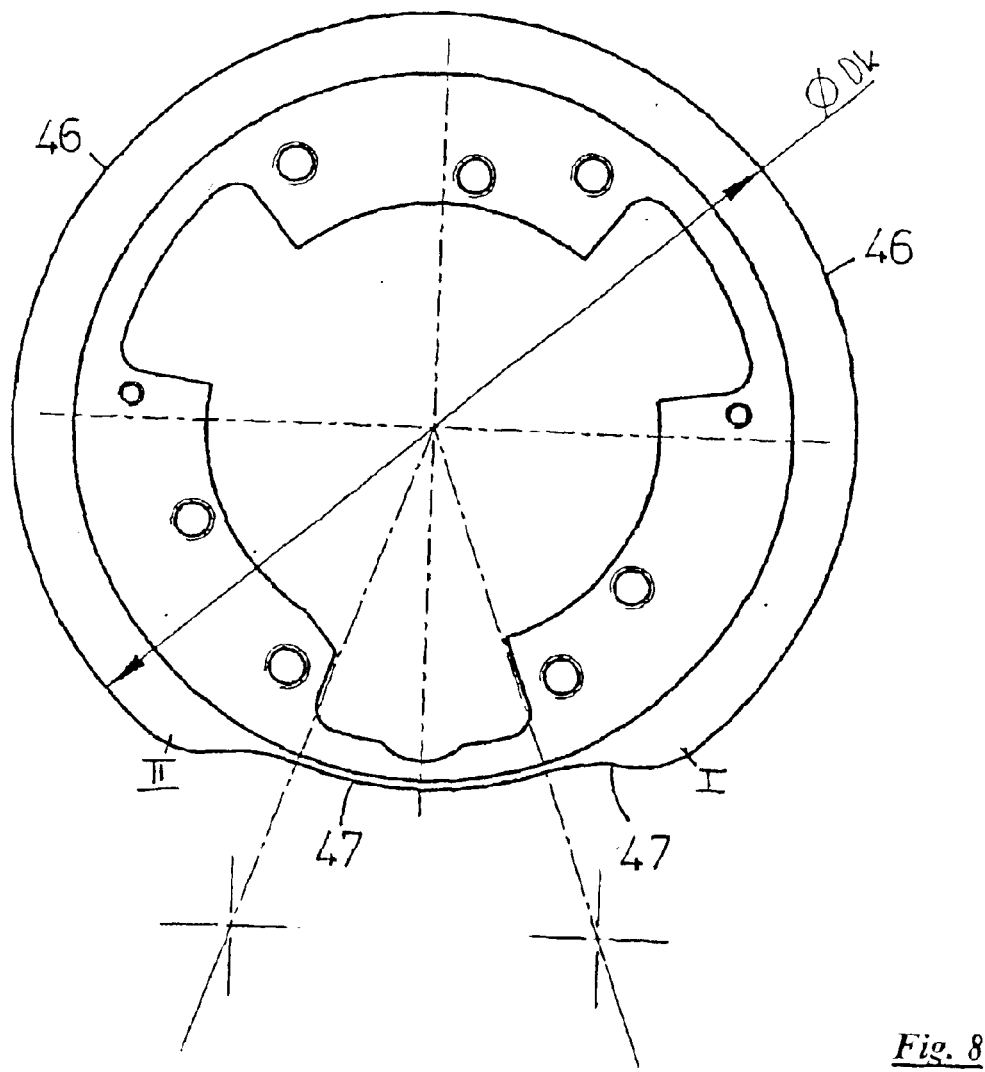
FIG. 8 is a diagrammatic plan view of an annular control cam with an opening, the opening being disposed at the periphery of the annular control cam.

If it is therefore intended that the cut is to be implemented along the groove 11, then the control roller 27 is rotated as shown in FIG. 8 starting from position I (0°) and the rotor 3 is rotated in the counterclockwise direction, so that the control roller 27 correspondingly rolls against the part-annular surface of the control cam 46 towards the left until reaching the position II. During that entire travel movement the cutting operation is carried out, and at the same time the control ring 48 is moved downwardly into the position shown in FIGS. 2 and 3 by means of the pneumatic drives 49. The control roller 27 rolls against the outer circular periphery of the control ring 48 over the region of the short distance between positions II and I, whereafter the cut is completed. Nonetheless the rotor 3 continues to rotate, the control roller 47 continues to run over the control cam 46 in the counter-clockwise direction, in which case now the control ring 48 is drawn axially upwardly. When the control roller 27 passes into the region of the position II again, then from then on it rolls downwardly into the opening 47, where the cutting function is concluded. The cutting blade 32 has moved out of cutting engagement. The dome 5 has been cut away from the neck 4, and the bottle can be removed downwardly or the cutting head 1 can be withdrawn upwardly, in order thereafter to introduce a new bottle so that the operation is repeated.

What is claimed is:

1. A device for opening blown plastic bottles which have been air-tightly closed by a dome which is fused shut, and which are provided with a closure screwthread and which are disposed in holding means of the device, by cutting off the dome with a cutting blade which is mounted in a cutting head of the device and which is movable relative to the dome, wherein the holding means engages with the portion of the dome, which is to be cut off, and includes at least two centering fingers which are movable radially relative to the dome and which are arranged closer to the bottle end of the cutting head than the cutting blade;

the cutting head includes a passage through which cut-off domes are transported; and the holding means is adapted to be brought into and out of engagement with only the dome, the holding means includes:

means adapted to (i) hold the dome when the dome is cut off and (ii) release the dome so that the dome can be pushed into the passage by a lower next dome that has not been cut off of a lower next bottle; and at least one arresting pin arranged in the region of the centering fingers, the at least one arresting pin is adapted to allow the dome to be pushed upwardly into the passage in the direction of the longitudinal axis of the passage such that the at least one arresting pin engages a holding groove of the dome and prevents the dome from being pulled downwardly.

2. A device as set forth in claim 1 wherein all centering fingers of the device engage a holding groove of the bottle.

3. A device as set forth in claim 1 wherein the cutting blade is movable radially relative to the passage by way of a pivotably driven blade shaft extending parallel to the longitudinal axis of the passage.

4. A device as set forth in claim 3 wherein the blade shaft is mounted in an annular rotor which embraces a stator including the passage and wherein the rotor is driven rotatably with respect to the stator.

5. A device as set forth in claim 4 further comprising a control roller adapted to control the radial pivotal movement of the cutting blade, the control roller is rotatably connected to the blade shaft and which upon rotation of the rotor passes around a control cam non-rotatably fixed to the stator.

6. A device as set forth in claim 5 wherein the control cam extends in an annular configuration at a spacing around the passage and has an opening in the radial direction, the device comprises a circular control ring which is non-rotatably and axially movable with respect to the control cam, wherein the outside diameter of the control ring is approximately equal to the largest outside diameter of the control cam.

7. A device as set forth in claim 1 wherein the cutting blade is formed by at least first and second straight edges of which the first straight edge is a cutting edge and intersects the second straight edge at an angle of approximately 90° and preferably less than 90°.

8. A device as set forth in claim 7 wherein the cutting edge is formed by two cutting planes which intersect at a second acute angle and extends parallel to and at a spacing from the upper and lower planes of the cutting blade.

9. A device as set forth in claim 1 wherein the arresting pins are spring-loaded and resiliently engage a holding groove of the bottle.

10. A device as set forth in claim 1 wherein the centering fingers are radially movable into a holding groove of the dome to hold the bottle.

11. A device as set forth in claim 10 which comprises at least three centering fingers arranged substantially uniformly over the periphery of the dome.

12. A device as set forth in claim 1 wherein the centering fingers are radially movable into a holding groove of the dome to hold the bottle, and the arresting pins are arranged at the same height between the centering fingers.

13. A device as set forth in claim 12 which comprises at least three centering fingers arranged substantially uniformly over the periphery of the dome.

14. A device for opening a blown plastic bottle which has been air-tightly closed by a dome which is fused shut, and which includes a closure screwthread and a holding groove, the device comprising:

a cutting blade mounted in a cutting head and adapted to cut off a dome of a bottle, the cutting head includes a passage through which the cut-off dome of the bottle is transported;

at least two centering fingers arranged vertically axially above the cutting blade when the passage is arranged vertically, the centering fingers are (i) pivotable inwardly relative to the dome such that the centering fingers engage with the holding groove of the dome when the dome is being cut off and (ii) pivotable outwardly relative to the dome such that the centering fingers move out of the holding groove and release the dome to allow the dome to be pushed into the passage by a dome of a next bottle that has not been cut off of the next bottle; and at least two spring-loaded arresting pins arranged between the centering fingers, the arresting pins are adapted to allow the dome to be pushed upwardly into the passage in the direction of the longitudinal axis of the passage such that the arresting pins (i) resiliently engage the holding groove of the dome and prevent the dome from being pulled downwardly and (ii) hold the dome that has been cut off the bottle.

15. A device as set forth in claim 14 wherein the centering fingers are radially movable into the holding groove of the dome to hold the bottle, and the respective arresting pins are arranged between the centering fingers.

16. A device as set forth in claim 15 which comprises at least three centering fingers arranged substantially uniformly over the periphery of the dome.

* * * * *